United States Patent [19]
Cantz

[11] 3,719,478
[45] March 6, 1973

[54] TIRE STUD HAVING POROUS IMPREGNATED BODY

[75] Inventor: Rolf J. Cantz, Grove City, Pa.

[73] Assignee: Kennametal Inc., Latrobe, Pa.

[22] Filed: Dec. 15, 1969

[21] Appl. No.: 885,127

[52] U.S. Cl..................75/208 R, 29/182.3, 75/200, 75/222, 152/210
[51] Int. Cl...............................................B60c 11/14
[58] Field of Search............75/200, 208 R, 222, 214; 29/182.1, 182.3; 117/49; 152/210

[56] References Cited

UNITED STATES PATENTS

| | | | |
|---|---|---|---|
| 2,376,706 | 5/1945 | Lum | 75/200 |
| 3,230,997 | 1/1966 | Carlstedt | 152/210 |
| 3,545,515 | 12/1970 | Gottauf | 152/210 |
| 3,532,148 | 10/1970 | Kolbl | 75/203 |
| 3,476,166 | 11/1969 | Simon | 152/210 |
| 3,464,476 | 9/1969 | Scheuba et al. | 152/210 |

Primary Examiner—Carl D. Quarforth
Assistant Examiner—B. Hunt
Attorney—Melvin A. Crosby

[57] ABSTRACT

The specification discloses a tire stud in which the body is formed of sintered metal powder and is about 60 per cent theoretical density. The pores in the stud body are impregnated with a plastic material.

3 Claims, 3 Drawing Figures

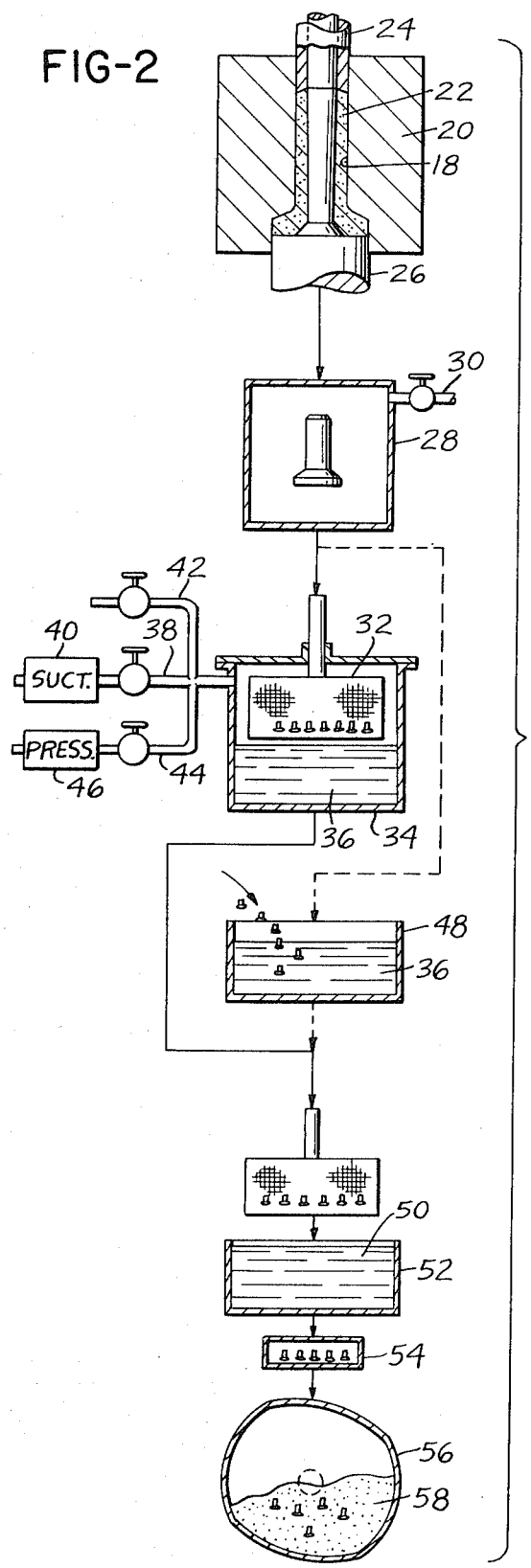
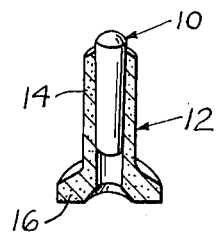
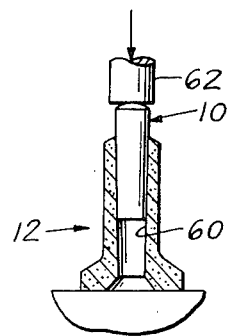

TIRE STUD HAVING POROUS IMPREGNATED BODY

The present invention relates to tire studs and is particularly concerned with tire studs having bodies made of sintered powdered metal and impregnated with an impregnating material such as plastic.

Tire studs are well-known items of commerce and are widely used in snow regions for giving added traction to tires. The most popular type stud at the present time consists of a tubular metal body having a head on one end and having a hard wear resistant pin extending into the body from the end opposite the head. The pin protrudes slightly from the end of the stud body opposite the head end and, when the stud is mounted head end foremost in a blind hole provided therefor in the tread material of a tire with the pin end of the stud protruding slightly from the tread, the stud will be resiliently pressed against the road surface as the tire rolls thereon and will bite into snow and ice and thereby add traction to the tire. The holes in the tire head for receiving the studs are smaller in diameter than the studs so the tread material around the stud is stressed and holds the stud tightly.

Inasmuch as, even in heavy snow regions, the roads are often free of snow and ice during the snow period, the tires in which the studs are mounted are often rolling on clean dry road surfaces. On a clean dry road surface, particularly when the tire slides on the surface during periods of acceleration, cornering or braking, a substantial amount of heat can be generated in the stud by the friction of the pin on the road surface. Even in normal operation of the tire on a dry clean road surface, there is some slippage of the stud on the road surface which will generate heat in the stud. Under normal circumstances, the heat will dissipate readily from the stud because it is exposed to the atmosphere about nine-tenths of the time. There are circumstances, however, especially when wheels are locked and the tires slide on the roadway, as when making a panic stop, that high levels of temperature will be reached in the stud.

The pin in the stud body in extreme conditions can even approach 900° F. or more. With the pin reaching such high temperatures, the entire stud becomes heated and can average out to a temperature in excess of that temperature at which tire tread rubber will begin to deteriorate rapidly. Such deterioration of the tire tread rubber in the immediate vicinity of the stud is objectionable, for the reason that the rubber around the stud loses the stress which it exerts on the stud which can cause loosening of the stud in the tire and the stud can become ineffective or will finally fall out of the tire, or will tilt in the tire beyond allowable limits and wear off on the side.

In an earlier application filed by the assignee of the present application, Ser. No. 661,000, in the name of Ragnar L. Carlstedt, filed Aug. 16, 1967, now U.S. Pat. No. 3,477,490, and titled "TIRE STUD," there is disclosed a stud having a sintered body in which the material of the body is stainless steel. A particular advantage of the stud shown in the aforementioned issued patent is that the extremely low heat conductivity of the stainless steel greatly reduces the rate at which heat is transferred from the pin through the stud body into the tread rubber, thus permitting more of the heat from the pin to be dissipated to the road surface and the atmosphere thereby reducing the maximum temperature at the outer surface of the stud body to below the temperature to which reversion or deterioration of the tread rubber occurs. While the stud referred to in the aforementioned issued patent has the advantages referred to, stainless steel powders are quite expensive and can be difficult to work so that commercial adaptation of the idea of the issued patent has not yet taken place on a large scale.

The present invention proposes to attack the problem of maintaining the outer surface of the body of a tire stud at acceptably low temperatures while realizing other benefits as well by forming the stud body by powdered metal techniques utilizing either stainless steel powders or, preferably, iron powders while compressing the powders to a lower degree of density than has heretofore been the practice and by, furthermore, impregnating the stud body after compacting and sintering thereof with a plastic material.

The advantage of compacting the stud bodies to a lower degree of density than heretofore has the result of making the stud body lighter, more inexpensive than has heretofore been the case. Also, since the stud body has relatively low density, it is relatively easily penetrated by plastic impregnating material with the impregnating material in liquid form. The impregnating material reduces the heat conductivity of the stud body and seals it against picking up bits of abrasive or corrosive fluid such as chloride solutions that are used in the winter and, still further, inhibits corrosion of the metal of the stud body. Such plastic impregnating materials can readily be colored and this will impart color to the stud body so that the appearance of the studs is more attractive and the studs can readily be identified by a simple color coding.

The anticorrosion properties of the plastic impregnating material is of particular benefit when iron powders are used for the manufacture of the stud bodies. Such powders tend to rust and corrode readily but with the stud bodies made of iron powders impregnated with the plastic material, rust and corrosion of the iron powders is reduced to a minimum and the strength of the bodies are thus prevented from diminishing through exposure to the elements and chemical materials used on roadways.

The plastic impregnating material has the additional benefit of filling the pores of the stud body on the surface of the stud body that engages the tread rubber so that the stud body will present a smooth surface to the tread rubber and will not tend to wear the rubber away as the rubber flexes about the stud body and, also, the outer surface of the stud body does not tend to retain particles of abrasive grit that might be picked up from the roadway in use and this will reduce the abrasion of both the rubber and the stud body.

It is also possible to compound the plastic impregnating material so that it serves as a lubricant for assisting in the installation of the stud into the tire tread. The studs are mounted in blind holes in the tire tread which are substantially smaller in diameter than the diameter of the stud body in the mounting of the stud in the tire tread is normally carried out by expanding the hole in the tire tread and pushing the stud into the expanded hole head end foremost and then permitting the rubber to collapse around the stud body. It is desired that the stud heads remain in position at the bottom of the holes without disturbance for a running in period of, say, 50 to 75 miles and studs with a plastic impregnant in the powdered metal bodies thereof according to the present invention tend to have greater stability in the tire treads and thus are not disturbed in the tire treads during the important initial running in period.

A panic stop in this initial stage before the stud is properly bedded in the tire can cause inclining of the stud into an improper position due to the high temperature developed in the tread material and the stud of the present invention is less subject to such inclining into an improper position because the lower heat conductivity of the stud tends to prevent overheating of the tread material in which the stud is mounted.

The nature of the present invention will be more clearly comprehended upon reference to the following detailed specification taken in connection with the accompanying drawings in which:

FIG. 1 is a perspective view of a typical stud with the body broken away to show the internal construction thereof;

FIG. 2 shows a flow chart of the manner of manufacturing a stud body according to the present invention; and FIG. 3 is a view showing the assembly of the stud body with the wear resistant carbide pin that forms a part of the stud.

Referring to the drawings somewhat more in detail, in FIG. 1, a stud will be seen to comprise a hard carbide pin 10 mounted in a body 12. The pin can be brazed or cemented into the body but it is preferable for the pin to taper inwardly somewhat from its outer end to its end whereby it can be pressed into a central bore in the body with an interference fit and will be held firmly in the body.

The body comprises a generally tubular shank portion 14 with a flange or head 16 formed thereon at the end opposite the end into which pin 10 extends.

The stud body according to the present invention is processed as illustrated in FIG. 2. In this figure it will be seen that powder is charged into cavity 18 of a die 20 as indicated at 22. This powder is preferably iron powder which may contain additives or stainless steel powders of various compositions. The powder 22 in the shaped cavity 18 is pressed between upper and lower plungers 24 and 26, respectively, at a pressure which will result in a sintered body having a density of about 55 to about 65 per cent, preferably about 60 per cent theoretical density. To press the powders to the degree that the sintered body will have about 60 per cent theoretical density does not require any great amount of pressure to be exerted on punches 24 and 26.

After pressing, the compacted body is removed from the die cavity and is then sintered in a chamber 28 in which a supply of inert gas is maintained as by the valved conduit 30. The sintering temperature can vary considerably, depending upon the time allowed for the sintering operation, but with iron powders, it has been found that sintering at about 2,000° F. for a period of 30 minutes results in good bonding of the compacted particles to each other with no significant diminishing of the porosity of the sintered body.

The sintered bodies are now ready for impregnation with a heat curable plastic material which is in liquid form at the time that impregnating takes place.

One manner of impregnating the bodies is to place them in a screen like basket 32 and to place the basket in a chamber 34 containing a liquid plastic impregnant at 36. After chamber 34 is sealed, it is evacuated through valve conduit 38 leading from the chamber to a source of suction 40. When the suction has been applied to chamber 34 for a sufficient length of time to draw occluded gases from the stud bodies, say, about 5 minutes, basket 32 is lowered into the chamber 34 and the vacuum is then interrupted as by closing the valve in valved conduit 38 and opening the valve in a valved conduit 42 leading to the atmosphere.

Thereafter the valve in conduit 42 is closed and the valve in the valved conduit 44 leading from chamber 34 to a source of pressure at 46 is opened and the chamber is pressurized. After a period of time, say, about 5 minutes, the valve in conduit 44 can be closed and the one in conduit 42 opened to release pressure from chamber 44 and the stud bodies, now substantially completely impregnated with impregnant 36 can be removed from the chamber.

As an alternate manner of impregnating the stud bodies, the stud bodies can be heated up to about 130° or 140° F. and immersed in impregnant 36 in an open chamber 48. The stud bodies at the aforementioned temperature are at a higher temperature than the impregnant and when the stud bodies are immersed in the impregnant, the chilling of the stud bodies will cause the impregnating material to be drawn into the pores of the bodies.

Following the impregnating of the stud bodies in either of the aforementioned manners, the stud bodies are rinsed as by dipping them into a body of solvent 50 contained in a open chamber 52 in order to remove excess impregnating material from the surface of the stud bodies. The stud bodies following the rinsing are heated in an oven 54 at a temperature of about 300° F. until the plastic impregnating material reaches an irreversible cured condition.

The bodies are then honed in any suitable manner such as by placing them in a tumbling barrel 56 with an abrasive material 58 and tumbling the a bodies until sharp corners and burrs are removed therefrom and the surfaces of the bodies become smooth.

Thereafter the stud bodies are ready to assemble with the pins as shown in FIG. 3 wherein pin 10 is being pressed into the bore 60 of a stud body 12 by a ram 62. The studs are now complete and are ready for being placed in tires for use therein. As mentioned, the plastic impregnating material may be colored by the addition of a die or an extremely finely comminuted pigment so that any desired colors can be imparted to the stud bodies for the sake of improved appearance and ready identification.

The resulting stud is relatively light in weight, has greatly reduced heat conductivity over solid stud bodies, or more highly compacted metal stud bodies, is corrosion resistant, has a smooth outside surface, is attractive in appearance and is readily identifiable as to size and type due to the color of the plastic impregnating material.

Suitable plastic materials for impregnating the stud bodies will suggest themselves to those skilled in the art and, as an example, polyester resin is a suitable plastic for this purpose.

Modifications can be made within the scope of the appended claims.

What is claimed is:

1. In a method of making a tire stud having a body and a pin of hard wear resistant material mounted in the body and projecting from one end thereof, comprising; compacting powdered metal selected from the group consisting of stainless steel and iron to about 50 per cent of theoretical density and to the configuration of the body and with a bore to receive the pin, sintering the compacted powdered metal body in an insert atmosphere, subjecting the body to reduced pressure to draw gases from the voids therein, immersing the body in a bath of heat curable plastic material dissolved in an evaporatable solvent, subjecting the bath to pressure while the body is therein to force the plastic material into the voids in the body, rinsing the body following said impregnation thereof, heating the body to drive of residual solvent and to cure the plastic material, and press fitting a tapered pin of hard wear resistant material small end foremost into said bore at said one end of said body.

2. The method according to claim 1 in which said bodies following the curing of the said plastic material are tumbled in an abrasive medium to remove sharp edges therefrom.

3. The method according to claim 1 in which said plastic material is pigmented to impart color to the stud body.

* * * * *